United States Patent
Inadama

[11] Patent Number: 6,126,466
[45] Date of Patent: Oct. 3, 2000

[54] DEVICE FOR CONNECTING AN INTEGRATED CIRCUIT CARD

[75] Inventor: Masayuki Inadama, Miyagi-ken, Japan

[73] Assignee: Alps Electric Co., Ltd., Tokyo, Japan

[21] Appl. No.: 09/087,052

[22] Filed: May 29, 1998

[30] Foreign Application Priority Data

May 30, 1997 [JP] Japan .................................. 9-142372

[51] Int. Cl.$^7$ .................................................. H01R 13/15

[52] U.S. Cl. ............................................................ 439/260

[58] Field of Search ...................................... 439/260, 267, 439/630; 235/441

[56] References Cited

U.S. PATENT DOCUMENTS

| | | | |
|---|---|---|---|
| 4,976,630 | 12/1990 | Schuder et al. | 439/260 |
| 5,012,078 | 4/1991 | Pernet | 235/441 |
| 5,066,241 | 11/1991 | Hills | 439/260 |

FOREIGN PATENT DOCUMENTS

| | | |
|---|---|---|
| 39 31 508 A1 | 4/1991 | Germany . |
| WO 98/04994 | 2/1998 | WIPO . |

*Primary Examiner*—Neil Abrams
*Assistant Examiner*—Javaid Nasri
*Attorney, Agent, or Firm*—Brinks Hofer Gilson & Lione

[57] ABSTRACT

In an integrated circuit (IC) card connector, an opening is formed between a base and a cover; and a rotary shaft of a lever member is rotatably retained, and includes a pressing portion and an inclined portion, both of which are formed at the lower face of the lever member through the rotary shaft. A plurality of terminals are affixed to the base in the manner of a cantilever. Contact portions of each of the terminals are such as to protrude into the opening, by an amount which is restricted by a pressurization restricting member which pressurizes them. The resilient member, having a taper portion and a flat portion, is integrally molded with the base. The taper portion is extended obliquely from the inside bottom surface of the opening towards the back side of the IC card connector. The flat portion protrudes with respect to the inside bottom surface of the opening, and is positioned above the contact portions. When the IC card is being inserted into the opening, the IC card is guided along the resilient member in order to separate it from the contact portions. When the insertion is completed, the lever member is rotationally driven by making the front end of the IC card strike against the inclined portion. A pressing portion pushes the IC card downward, while it deforms the resilient member, causing the contact of the IC card to contact the contact portions of the terminals.

4 Claims, 3 Drawing Sheets

DEVICE FOR CONNECTING AN INTEGRATED CIRCUIT CARD

BACKGROUND OF THE INVENTION

1. Field of the Invention

The present invention relates to an integrated circuit (IC) card connector used for exchanging signals between it and an inserted IC card.

2. Description of the Related Art

An IC card is a card incorporating an IC with computing and storing functions. An external device, such as a personal computer or a digital camera, for processing information on a recording medium, such as the aforementioned IC card, is provided with an IC card connector with terminals formed in correspondence with contacts of the IC card.

Conventionally, such an IC card connector has been disclosed, for example, in U.S. Pat. No. 4,976,630. The disclosed IC card connector is of the landing type in which contacts of the IC card and terminals of the connector contact each other with almost no sliding between the contacts and the terminals. In general, the IC card connector of the specification includes a slider with a plurality of terminals at its back surface, a stationary frame for obliquely guiding the slider, a return spring for biasing the slider towards its position of recession, and a pair of clips provided at the stationary frame. The IC card is guided along the stationary frame in the forward and backward directions.

In the IC card connector having the above-described structure, when the IC card is not inserted, the slider is at the ascended position towards the back side. When the IC card is inserted horizontally along the stationary frame, the inserted IC card pushes the slider obliquely forward, during which the terminals of the slider contact the corresponding contacts of the IC card. When the IC card is inserted further, it is held at a loading position by a clip. At this time, the slider is at the descended position towards the front side, so that the terminals and their corresponding contacts are kept reliably in contact with each other. On the other hand, when the IC card is pulled out of the stationary frame against the resilient force of the clip member, the return spring causes the slider to return back to the ascended position towards the back side, during which the terminals separate from their corresponding contacts.

In the above-described conventional IC card connector, the slider moves obliquely upward or downward with respect to the IC card to be inserted and taken out in a horizontal direction, so that the terminals of the slider can be brought into contact with and be separated from their corresponding contacts of the IC card with almost no sliding between the slider and the IC card. Therefore, compared to the friction type IC card connector in which friction is produced when the terminals are brought into contact with and separated from their corresponding contacts, the landing type allows a person to more readily feel the IC card being inserted or removed, and allows more reliable connection.

However, the above-described landing type IC card connector requires two types of spring members, a return spring for returning the slider back to its initial position, and a clip for holding the IC card at the loading position. These spring members not only take up space and thus prevent the production of smaller and thinner IC card connectors, but also may either prevent the slider from being restored back to its initial position or the IC card from being held at the loading position by the clip, when the resilient forces of the return spring and the clip are not properly set relative to each other. Since the IC card is held by the clip at the loading position, repeated insertion and removal of the IC card, for example, causes permanent setting of a spring portion of the clip, prevents the IC card from being reliably held at the loading position, or causes the clip to damage the IC card.

SUMMARY OF THE INVENTION

In the structure of the IC card connector according to the present invention, a plurality of terminals, in a pressurized state, are retained by a housing, a resilient member and a lever member are disposed in an opening of the housing. During insertion of the IC card into the opening towards the back side of the IC card connector, the IC card is guided obliquely upward along the resilient member to keep the contacts of the IC card and the terminals separated from each other. When the insertion of the IC card is completed, the lever member is rotationally driven, as a result of inserting the IC card, in order to push the IC card downward against the resiliency of the resiliently member, thereby bringing the contacts and their respective terminals in contact with each other. In this structure, the lever member, driven by the force exerted to insert the IC card, rotates to ensure contact of the pressurized terminals with the corresponding contacts of the IC card. Therefore, compared to the conventional landing type IC card connector, in which a slider and two types of spring members are used, not only is the structure of the IC card connector simplified, so that it can be made smaller and thinner, but also more reliable contact between the contacts of the IC card and their corresponding terminals can be realized.

According to the present invention, there is provided an IC card connector, comprising a housing having an opening for inserting therein an IC card; a plurality of terminals affixed to the housing in the manner of a cantilever, the free end side of each terminal being biased into the opening; a pressurization restricting portion for restricting the amount by which each of the terminals protrudes into the opening; a resilient member, disposed at the inside bottom surface of the opening, for obliquely guiding the IC card above the protruding ends of each of the terminals; and a lever member rotationally driven by being rotatably and axially supported by the housing and bringing the lever member into contact with the IC card; wherein during insertion of the IC card, a contact of the IC card is kept apart from the terminals by the resilient member; and wherein when the insertion of the IC card is completed, the lever member pushes the resilient member towards the inside bottom surface of the opening through the IC card in order to bring the contact of the IC card and the terminals into contact with each other.

Although the lever member may take any form that allows it to be rotationally driven by the force exerted to insert the IC card, when the lever member is provided with an inclined portion at a location of the lever member corresponding to where it contacts the front end portion of the IC card, and the front end portion of the IC card is brought into contact with the inclined portion of the lever member, the force, exerted to insert the IC card, can easily cause the lever member to rotate.

Although the resilient member can be composed of a resilient metallic plate, and attached to the housing after the housing has been formed, when the resilient member is integrally molded with the housing in the manner of a cantilever, and a taper portion and a flat portion are formed continuously from the fixed end side to the free end side of the resilient member, it is possible to reduce the number of parts and manhours required for assembling the IC card connector.

DESCRIPTION OF THE PREFERRED EMBODIMENT

Figure 1:
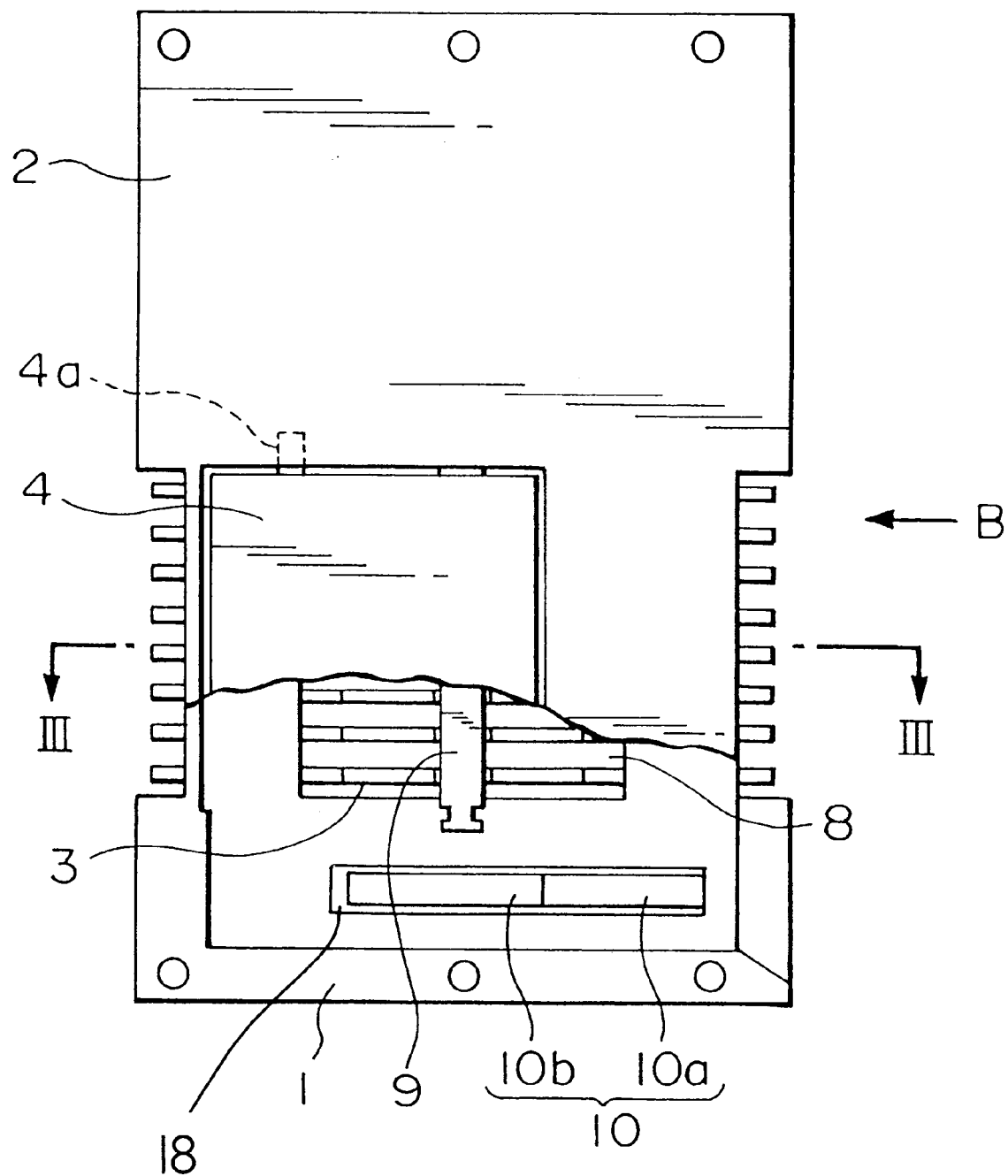
FIG. 1 is a partly cutaway plan view of an embodiment of an IC card connector.
Figure 2:
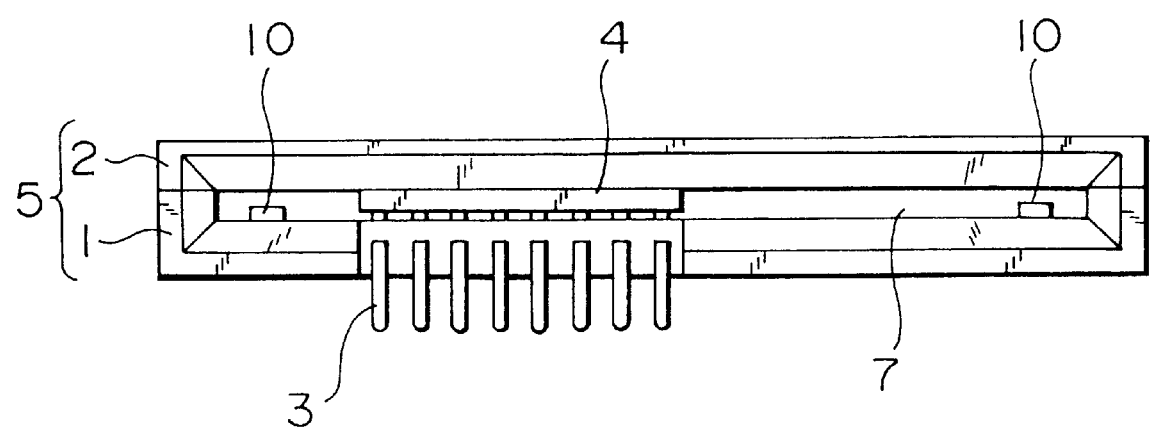
FIG. 2 is a front view of the IC card connector.
Figure 3A:
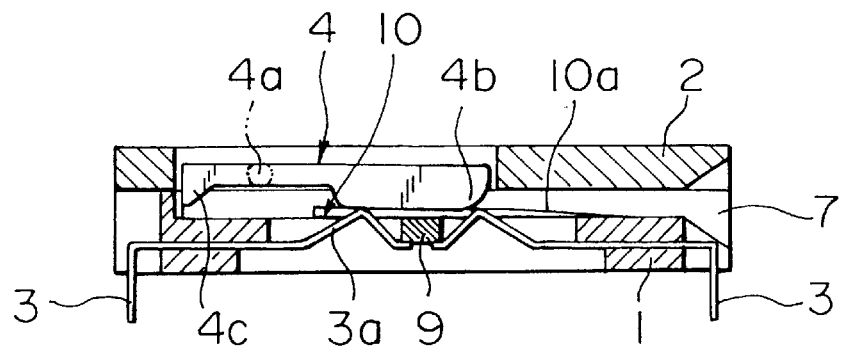
FIG. 3A is a view in which an IC card is not inserted.
Figure 3B:
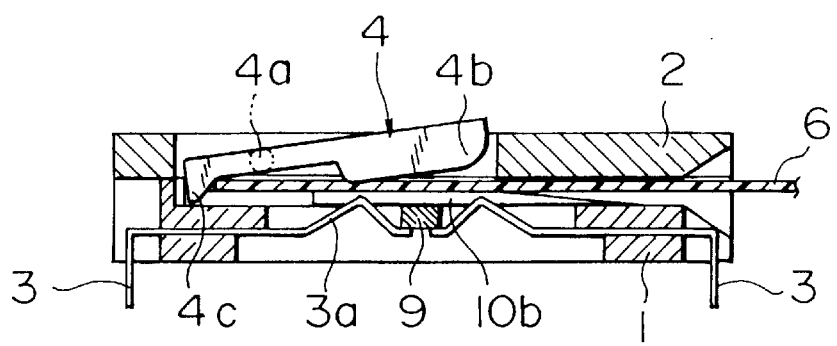
FIG. 3B is a view in which an IC card is partly inserted.
Figure 3C:
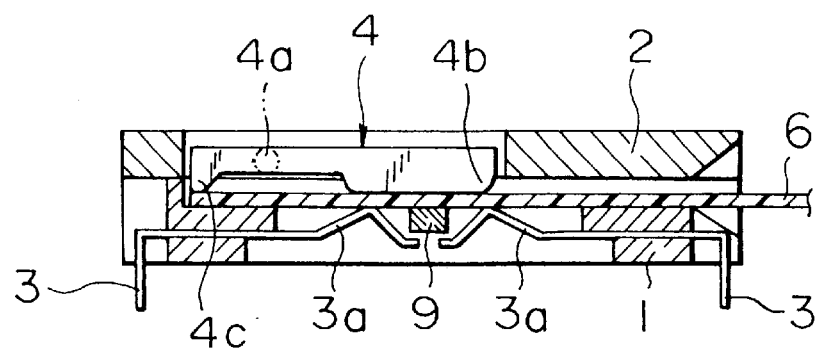
FIG. 3C is a view in which an IC card is completely inserted.

A description will now be given of a preferred embodiment of the present invention with reference to the drawings. FIG. 1 is a partly cutaway plan view of an IC card connector. FIG. 2 is a front view of the IC card connector. FIG. 3A is a view in which an IC card is not inserted. FIG. 3B is a view in which an IC card is partly inserted. FIG. 3C is a view in which an IC card is completed inserted. FIGS. 3A to 3B are views taken along line 3—3 of FIG. 1.

As shown in the figures, the IC card connector of the embodiment includes a base 1 made of synthetic resin, a cover 2 made of synthetic resin and integrally joined to the top surface of the base 1 by, for example, thermal caulking, a plurality of terminals 3 retained by the base 1, and a lever member 4 rotatably retained between the base 1 and the cover 2. The base 1 and the cover 2 make up the housing 5.

An opening 7 for inserting an IC card 6 therein is formed between the base 1 and the cover 2 so as to extend in a horizontal direction. An opening 8 which extends to the inside bottom surface of the opening 7 is formed in the base 1. A pressurization restricting member 9 bridges the center of the hole 8. Each of the terminals 3 is secured in the manner of a cantilever, for example, by press-fitting or insert molding. The terminals 3 are disposed in two rows in a direction perpendicular to the direction of insertion of the IC card 6 (or in the direction of arrow B of FIG. 1). Each terminal 3 has at its free end side a conical contact portion 3a for insertion into the opening 8. The free end of each terminal 3 is biased upwards so as to resiliently contact the bottom surface of a pressurization restricting member 9. In other words, the terminals 3 are retained by the base 1 in an upwardly pressurized state, and the pressurization restricting member 9 allows their contact portions 3a to protrude into the opening 7 only by a predetermined amount.

Elongated openings 18 are formed on both sides of the opening 8 (i.e., above and below the opening 8 in FIG. 1) formed in the base 1. (Only one of the openings 18 is shown in FIG. 1). In each opening 18, a resilient member 10 is integrally formed with the base 1 in the manner of a cantilever. Each resilient member 10 has a taper portion 10a and a flat portion 10b, formed continuously from the fixed end side to the free end side thereof. The taper portion 10a extends obliquely from the inside bottom surface of the opening 7 to the rearward side of the IC card connector. On the other hand, the flat portion 10b protrudes with respect to the inside bottom surface of the opening 7 by an amount slightly greater than the amount by which each contact portion 3a of its associated terminal 3 protrudes into the opening 7.

The lever member 4 has a pair of rotary shafts 4a extending coaxially with respect to each other. Each rotary shaft 4a is rotatably supported between the base 1 and the cover 2. The lever member 4 has at its lower face a pressing portion 4b and an inclined portion 4c, both of which are formed through the rotary shaft 4a and located in the opening 7.

A description will now be given of the operation of the IC card connector of the above-described embodiment. When the IC card 6 is not inserted, as shown in FIG. 3A, the contact portion 3a of each terminal 3, in a pressurized state, protrudes into the opening 7 only by a predetermined amount, and the flat portion 10b of the resilient member 10 is positioned above the contact portion 3a of each terminal 3.

When the IC card 6 is inserted and pushed into the opening 7 in the direction of arrow B of FIG. 1, the IC card 6 moves forward and obliquely upward along the taper portion 10a of the resilient member 10, and moves below the lever member 4. Then, the IC card 6 moves further forward in the horizontal direction along the flat portion 10b. In this case, the contact portion 3a of each terminal 3 is kept below the flat portion 10b, so that, during the insertion of the IC card 6, the IC card 6 and each contact portion 3a are kept apart from each other, with no friction being generated between the IC card 6 and each contact portion 3a. Thereafter, as shown in FIG. 3B, when the front end of the IC card 6 strikes the inclined portion 4c of the lever member 4, the horizontal force, exerted to insert the IC card 6, produces rotational motion at the inclined portion 4c of the lever member 4, causing the lever member 4 of FIG. 3B to rotate clockwise on the rotary shaft 4a as a center. Clockwise rotation of the lever member 4 causes the pressing portion 4b to press the top surface of the IC card 6 directly downward.

Further insertion of the IC card 6 into the opening 7 causes the pressing portion 4b to press the IC card 6 with a greater force. This greater force causes the resilient member, supporting the IC card 6, to be deformed, with the stem of the taper portion 10a serving as a fulcrum, so that, as shown in FIG. 3C, the completely-inserted IC card 6, in a loaded state, contacts the inside bottom surface of the opening 7. As a result, a plurality of contacts (not shown), provided at the back side of the IC card 6, contacts their respective contact portions 3a of the terminals 3. Transmission and reception of signals are performed through the contacts and the terminal 3. In this case, since each contact portion 3a is pressurized upwards, the contacts and their respective contact portions 3a can contact each other with a large contact pressure. In addition, since the IC card 6 is supported between the lever member 4 and the resilient member 10, the IC card 6 can be held at the loading position.

On the other hand, when the IC card 6, in the loading position of FIG. 3C, is pulled out from the opening, the front end of the IC card 6 separates from the inclined portion 4c of the lever member 4, so that the pressing portion 4b stops pressing the IC card 6. This causes the deformed portion of the resilient member 10, due to its own resiliency, to return back to its initial location, causing the IC card 6 to move upward and separate from the inside bottom surface of the opening 7 once again, whereby each terminal 3, due to its own resiliency, is restored back to its initial location. Therefore, when the IC card 6 is being pulled out, the IC card 6 and each contact portion 3a are kept apart from each other, and the IC card 6 is ejected, whereby the IC card connector returns back to its original state, as shown in FIG. 3A.

The present invention is carried out in the above-described preferred form, and provides the following effects.

The IC card connector includes a housing with an opening for inserting an IC card therein; a plurality of terminals affixed to the housing in the manner of a cantilever, with the free end side of each terminal being biased into the opening; a pressurization restricting portion for restricting the amount by which each terminal protrudes into the opening; a resilient member, disposed at the inside bottom surface of the opening, for obliquely guiding the IC card above the protruding ends of each of the terminals; and a lever member rotatably driven by rotatably and axially supporting it by the housing and contacting it with the IC card. The IC card connector is constructed such that, during insertion of the IC card, the contacts of the IC card are kept separated from the terminals by the resilient member, and such that, when the insertion of the IC card is completed, the lever member presses the resilient member in the direction of the inside bottom surface of the opening through the IC card in order to bring the contacts and the terminals into contact with each other. In this case, the rotational force of the lever member, driven by the force exerted to insert the IC card, can be used to ensure contact of the contacts of the IC card with the pressurized terminals. Therefore, not only is the structure of the IC card connector simplified, making it easier to make it smaller and thinner, but also more reliable contact between the contacts of the IC card and the terminals can be achieved.

When the lever member has an inclined portion, and the inclined portion is brought into contact with the front end portion of the IC card, the force, exerted to insert the IC card, can easily cause the lever member to rotate.

When the resilient member is integrally molded with the housing in the manner of a cantilever, and has a taper portion and a flat portion formed continuously from the fixed end side to the free end side thereof, it is possible to reduce the number of parts and manhours required to assemble the IC card connector.

What is claimed is:

1. A device for connecting an integrated circuit card, comprising:

a housing having an opening for inserting therein an integrated circuit card;

a plurality of terminals affixed to said housing in the manner of a cantilever, the free end side of each terminal being biased so as to protrude towards the inside of said opening;

a pressurization restricting portion for restricting the amount by which each of said terminals protrudes into said opening;

a resilient member, disposed at the inside bottom surface of said opening so as to be supported in the manner of a cantilever, for obliquely guiding the integrated circuit card, during insertion thereof, above the protruding ends of each of said terminals; and a lever member axially supported by said housing so as to be swingable, one end side of said lever member coming into contact with an insertion end of the integrated circuit card in order to cause said lever member to swing;

wherein during insertion of the integrated circuit card, contacts of the integrated circuit card are kept separated from said terminals by said resilient member; and wherein when the insertion of the integrated circuit card is completed, the other end side of said lever member which has swung pushes said resilient member towards the inside bottom surface of said opening through the integrated circuit card in order to bring the contacts of the integrated circuit card and said terminals into contact with each other.

2. The device according to claim 1, wherein said lever member has an inclined portion at the one end side thereof so as to allow the force exerted to insert the integrated circuit card produces swinging motion.

3. The device according to claim 1, wherein said resilient member is integrally molded with said housing in the manner of a cantilever, and includes a taper portion and a flat portion, formed continuously from the fixed end side to the free end side of said resilient member.

4. The device according to claim 2, wherein said resilient member is integrally molded with said housing in the manner of a cantilever, and includes a taper portion and a flat portion, formed continuously from the fixed end side to the free end side of said resilient member.

* * * * *